(12) United States Patent
Kim et al.

(10) Patent No.: US 8,369,862 B2
(45) Date of Patent: Feb. 5, 2013

(54) RESOURCE ALLOCATION AND POWER CONTROL METHOD

(75) Inventors: Hyun-Jae Kim, Incheon (KR); Sung Cheol Chang, Daejeon (KR); Won-Ik Kim, Daejeon (KR); Sung Kyung Kim, Daejeon (KR); Chul Sik Yoon, Seoul (KR); Jee Hwan Ahn, Daejeon (KR)

(73) Assignees: Samsung Electronics Co., Ltd., Suwon-si (KR); Electronics & Telecommunications Research Institute, Daejeon (KR)

( * ) Notice: Subject to any disclaimer, the term of this patent is extended or adjusted under 35 U.S.C. 154(b) by 362 days.

(21) Appl. No.: 12/770,124

(22) Filed: Apr. 29, 2010

(65) Prior Publication Data
US 2010/0279700 A1 Nov. 4, 2010

(30) Foreign Application Priority Data

Apr. 29, 2009 (KR) .......... 10-2009-0037715
Apr. 21, 2010 (KR) .......... 10-2010-0037034

(51) Int. Cl.
*H04W 72/00* (2009.01)
*H04B 7/00* (2006.01)
*H04B 17/00* (2006.01)

(52) U.S. Cl. .......... 455/452.1; 455/67.13; 455/522
(58) Field of Classification Search .......... 455/509, 455/450, 452.1, 453, 522, 452.2, 446, 464, 455/517; 370/229, 235, 335, 252, 280, 468, 370/477, 475, 437
See application file for complete search history.

(56) References Cited

U.S. PATENT DOCUMENTS

| | | | |
|---|---|---|---|
| 2003/0161268 A1* | 8/2003 | Larsson et al. | 370/229 |
| 2005/0043033 A1* | 2/2005 | Fabien et al. | 455/452.1 |
| 2007/0155392 A1* | 7/2007 | Cho et al. | 455/450 |
| 2009/0298523 A1* | 12/2009 | Ogawa et al. | 455/509 |

* cited by examiner

*Primary Examiner* — Melody Mehrpour
(74) *Attorney, Agent, or Firm* — Jefferson IP Law, LLP

(57) ABSTRACT

A method for controlling transmission power in a mobile communication system is provided. According to the method, a serving base station arranges a plurality of terminals in ascending order according to Carrier-to-Interference-and-Noise-Ratios (CINRs) based on the CINR measured by the plurality of terminals, classifies the plurality of terminals in one of a first group and a second group according to the order, allocates a subchannel of a data region corresponding to the first group from among a plurality of data regions included in the uplink frame to a terminal classified as the first group, and allocates a subchannel of a data region corresponding to the second group from among the data regions to a terminal classified as the second group.

14 Claims, 7 Drawing Sheets

RESOURCE ALLOCATION AND POWER CONTROL METHOD

PRIORITY

This application claims the benefit under 35 U.S.C. §119(a) of a Korean patent application filed on Apr. 29, 2009 in the Korean Intellectual Property Office and assigned Serial No. 10-2009-0037715 and of a Korean patent application filed on Apr. 21, 2010 in the Korean Intellectual Property Office and assigned Serial No. 10-2010-0037034, the entire disclosures of both of which are hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. And 2) Electronics and Telecommunications Research Institute.

BACKGROUND OF THE INVENTION

1. Field of the Invention

The present invention relates to a resource allocation and power control method. More particularly, the present invention relates to a resource allocation and power control method for an uplink frame in a mobile communication system.

2. Description of the Related Art

A conventional mobile communication system has a problem in that performance of a terminal located in a boundary region of a service coverage area of a serving base station is reduced because of interference caused by uplink data transmitted by a terminal located in a service coverage area of a neighboring base station. More particularly, when the serving base station broadcasts values of noise and interference measured from the service coverage area of the neighboring base station, the terminal of the serving base station increases the strength of its transmission signal in order to compensate for the interference from the terminal of the neighboring cell, and hence, compensate for performance of the terminal located in the boundary region of the service coverage area of the serving base station.

To address this problem, the serving base station classifies its service coverage area into frequency bandwidths for a central region and a boundary region according to the Fractional Frequency Reuse (FFR) method. The serving base station reuses the frequency bandwidth used for the boundary region of the neighboring base station in the central region of the serving base station and controls the transmission power to further avoid interference. Here, the serving base station and the neighboring base station exchange needed information through communication between the base stations so as to efficiently control interference. Also, the serving base station and the neighboring base station transmit control information for use by the terminal of the neighboring cell to reduce power of the uplink data which influences the terminal located in the service coverage area of the serving base station.

However, if the serving base station cannot establish a communication channel with the neighboring base station, the serving base station cannot exchange information with the neighboring base station, and hence, the serving base station must estimate interference from the service coverage area of the neighboring base station by measuring the signal received from the neighboring base station. The serving base station must also minimize interference applied to the service coverage area of the neighboring base station by the corresponding terminal by controlling uplink power for the terminal located in the central region of the corresponding base station. However, if a communication channel is not established between the serving base station and a neighbor base station, the interference estimation and control of transmission power by the serving base station becomes difficult.

Accordingly, there is a need for an improved method for providing a communication service when communication between base stations is unavailable.

SUMMARY OF THE INVENTION

An aspect of the present invention is to address at least the above-mentioned problems and/or disadvantages and to provide at least the advantages described below. Accordingly, an aspect of the present invention is to provide an apparatus and method to improve performance of a terminal in a cell boundary region and to provide a reliable service when communication between base stations is unavailable in a mobile communication system.

In accordance with an aspect of the present invention, a method for a serving base station of a plurality of terminals to allocate radio resources of an uplink frame to the terminals in a mobile communication system unavailable for communication between base stations is provided. The method includes arranging the plurality of terminals in ascending order of Carrier-to-Interference-and-Noise-Ratios (CINRs) based on the CINRs that are measured by the terminals, classifying the plurality of terminals in one of a first group and a second group according to the order, allocating a subchannel of a data region corresponding to the first group from among a plurality of data regions included in the uplink frame to a terminal classified in the first group, and allocating a subchannel of a data region corresponding to the second group from among the plurality of data regions to a terminal classified in the second group.

In accordance with another aspect of the present invention, a power control method for a base station to determine transmission power for an uplink frame in a mobile communication system unavailable for communication between base stations is provided. The method includes determining transmission power of a first data region from among a plurality of data regions included in the uplink frame as the maximum transmission power of a first terminal located in a service coverage area of the base station, and determining transmission power of a second data region from among the plurality of data regions based on interference from a second terminal located in a service coverage area of a neighboring base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, unless explicitly described to the contrary, the word "comprise" and variations such as "comprises" or "comprising" will be understood to imply the inclusion of stated elements but not the exclusion of any other elements.

In the specification, a Mobile Station (MS) may indicate a terminal, a Mobile Terminal (MT), a Subscriber Station (SS), a Portable Subscriber Station (PSS), User Equipment (UE), an Access Terminal (AT), and the like, and it may include entire or partial functions of the MS, the MT, the SS, the PSS, the UE, AT, and the like.

In the specification, a Base Station (BS) may indicate an Access Point (AP), a Radio Access Station (RAS), a NodeB (Node-B), an evolved Node-B (eNB), a Base Transceiver Station (BTS), a Mobile Multihop Relay (MMR)-BS, and the like, and it may include entire or partial functions of the AP, the RAS, the NB, the eNB, the BTS, the MMR-BS, and the like.

A resource allocation method for an uplink frame and a power control method in a mobile communication system according to an exemplary embodiment of the present invention will now be described with reference to accompanying drawings.

A mobile communication system according to an exemplary embodiment of the present invention will now be described with reference to FIG. 1.

Figure 1:
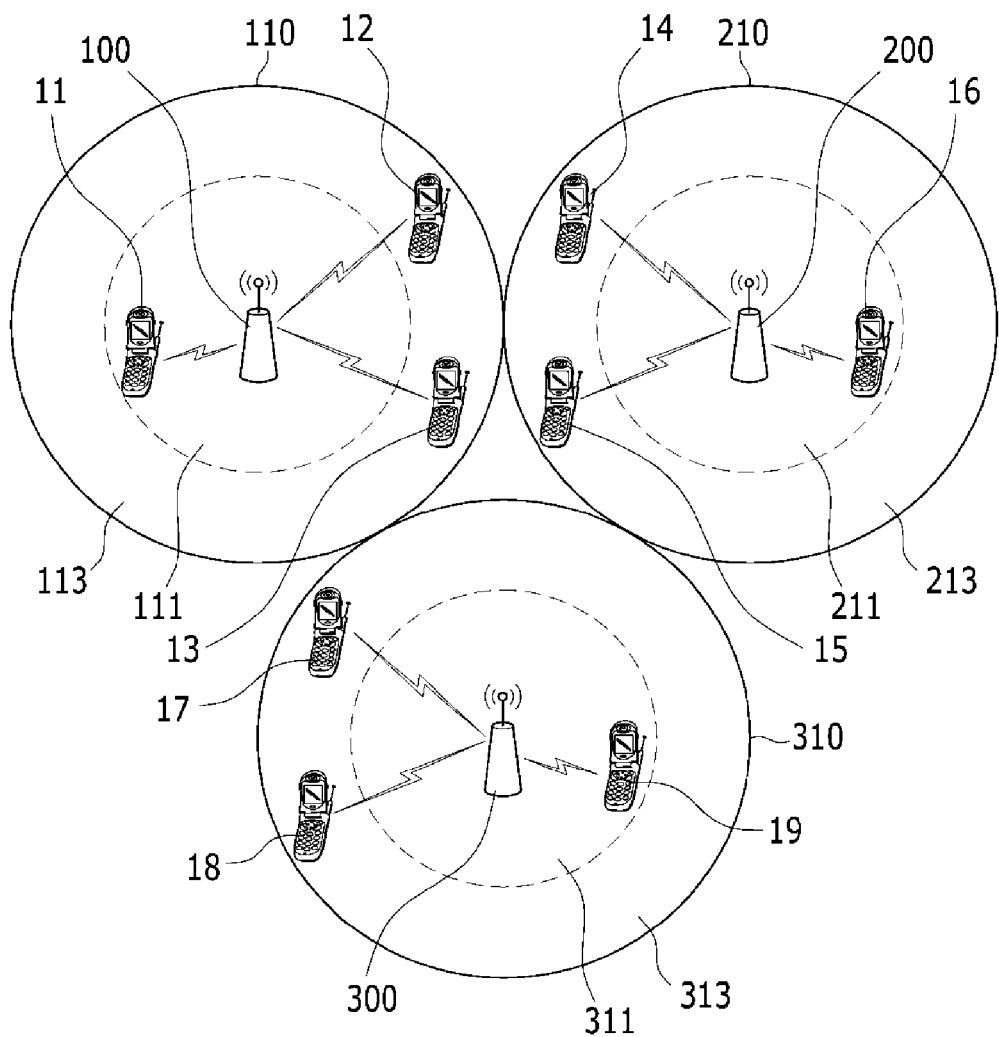
FIG. 1 shows a mobile communication system according to an exemplary embodiment of the present invention.

FIG. 1 shows a mobile communication system according to an exemplary embodiment of the present invention.

Referring to FIG. 1, the mobile communication system includes a first base station 100, a second base station 200, and a third base station 300 for communicating with a terminal. In this instance, the base stations use the same radio resource, and communication between the base stations is not allowed or otherwise not currently supported. Although FIG. 1 illustrates three base stations, it is to be understood that this is merely for convenience and not intended to be limiting. That is, the mobile communication system of FIG. 1 may include any number of base stations.

The first base station 100 communicates with the first terminal 11, the second terminal 12, and the third terminal 13 located in the region of a first cell 110 that is a service coverage area of the first base station 100. Here, the first cell 110 is divided into a central region 111 and a boundary region 113.

The second base station 200 communicates with a fourth terminal 14, a fifth terminal 15, and a sixth terminal 16 located in a region of the second cell 210 that is a service coverage area of the second base station 200. Here, the second cell 210 is divided into a central region 211 and a boundary region 213.

The third base station 300 communicates with a seventh terminal 17, an eighth terminal 18, and a ninth terminal 19 located in a region of the third cell 310 that is a service coverage area of the third base station 300. Here, the third cell 310 is divided into a central region 311 and a boundary region 313.

Figure 2:
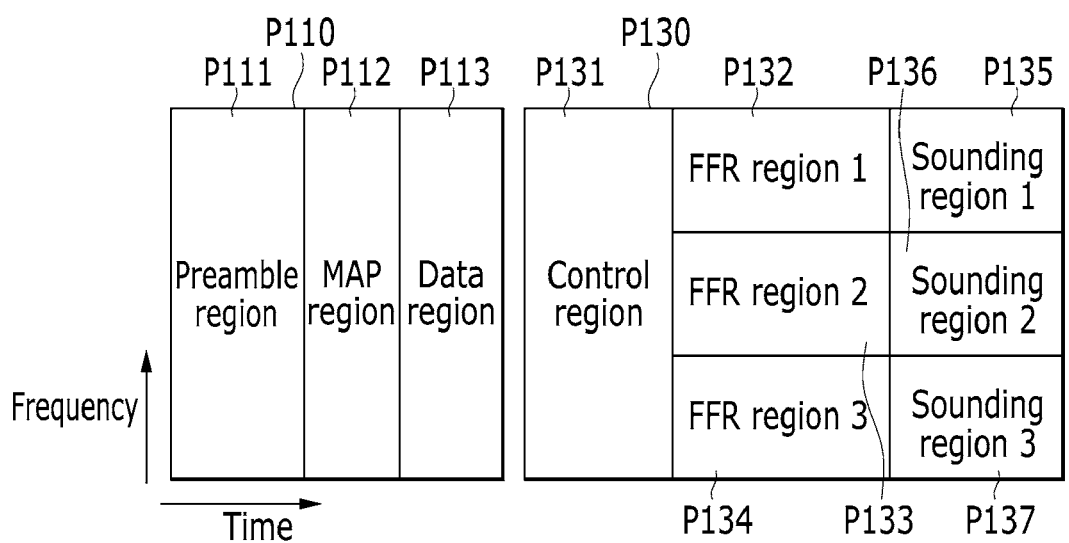
FIG. 2 shows a structure of a frame according to an exemplary embodiment of the present invention.

FIG. 2 shows a structure of a frame according to an exemplary embodiment of the present invention.

Referring to FIG. 2, a downlink frame P110 includes a preamble region P111, a MAP region P112, and a data region P113.

The preamble region P111 transmits a preamble for frame synchronization, cell searching, carrier frequency offset estimation, channel estimation, and the like.

The MAP region P112 transmits a symbol including a Frame Control Header (FCH) and a MAP message. Here, the FCH represents a header interval for notifying of frame configuration information, and the MAP message notifies the terminal of a result regarding whether the resource is dynamically allocated.

Data symbols are transmitted in the data region P113.

An uplink frame P130 includes a control region P131, a plurality of Fractional Frequency Reuse (FFR) regions and a plurality of sounding regions. Here, the FFR regions include a first FFR region P132, a second FFR region P133, and a third FFR region P134, and the sounding regions include a first sounding region 135, a second sounding region P136, and a third sounding region P137. It is to be understood that the number of FFR regions and sounding regions is merely for example and not to be considered limiting.

A control symbol for transmitting frame synchronization or channel quality information is transmitted in the control region P131.

The data symbols are transmitted in the respective FFR regions P132-P134.

Pilot symbols for estimating channel state information are transmitted in the sounding regions P135-P137.

In an exemplary implementation, the first base station 100 shown in FIG. 1 can allocate the first FFR region P132 to a terminal located in the boundary region 113 of the first cell 110 and the second FFR region P133 or the third FFR region P134 to a terminal located in the central region 111 according to the FFR method. In this instance, the first FFR region P132 is a dedicated resource region of the first base station 100, and the terminal to which the first FFR region P132 is allocated can transmit a signal with higher transmission power than the in the second FFR region P133 or the third FFR region P134.

Also, the second base station 200 shown in FIG. 1 can allocate the second FFR region P133 to a terminal located in the boundary region 213 of the second cell 210 and the first FFR region P132 or the third FFR region P134 to a terminal located in the central region 211 according to the FFR method. In this instance, the second FFR region P133 is a dedicated resource region of the second base station 200, and the terminal to which the second FFR region P133 is allocated can transmit a signal with higher transmission power than the in the first FFR region P132 or the third FFR region P134.

Similarly, the third base station 300 shown in FIG. 1 can allocate the third FFR region P134 to a terminal located in the boundary region 313 of the third cell 310 and the first FFR region P132 or the second FFR region P133 to a terminal located in the central region 311 according to the FFR method. In this instance, the third FFR region P134 is a dedicated resource region of the third base station 300, and the terminal to which the third FFR region P134 is allocated can transmit a signal with higher transmission power than the in the first FFR region P132 or the second FFR region P133.

Here, each of the first base station 100, the second base station 200, and the third base station 300 shown in FIG. 1 receives the preambles from the neighboring base stations, estimates dedicated resource regions of the neighboring base stations through the received preambles' frequency bandwidths or indexes, and determines the corresponding base station's dedicated resource region.

A method for a base station of a mobile communication system to allocate a resource for an uplink frame and control power in order to control interference between a terminal located in a service coverage area and a terminal located a service coverage area of a neighboring base station according to an exemplary embodiment of the present invention will now be described with reference to FIG. 3.

Figure 3:
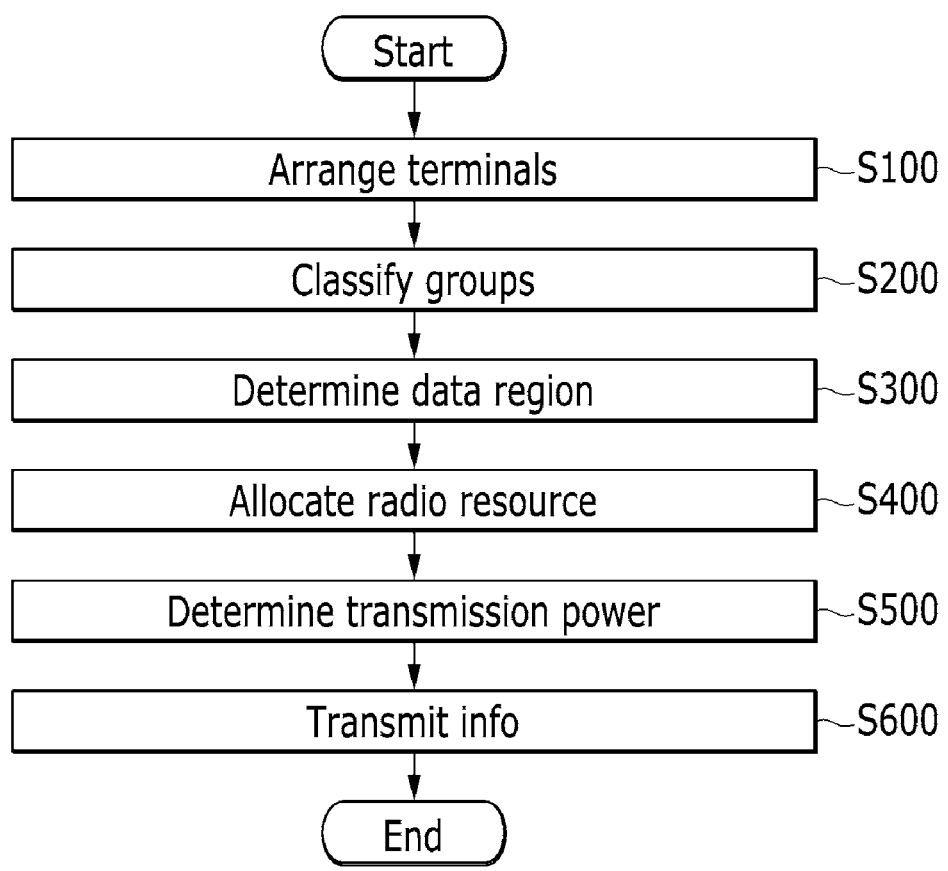
FIG. 3 shows a resource allocation and power control method according to an exemplary embodiment of the present invention.

FIG. 3 shows a resource allocation and power control method according to an exemplary embodiment of the present invention.

Referring to FIG. 3, when the terminals located in the first cell 110 measure the Carrier-to-Interference-and-Noise-Ratio (CINR) value on the preamble transmitted by the first base station 100 through the preamble region P111 and report the same to the first base station 100 that is a serving base station, the first base station 100 arranges the terminals in the ascending order of the CINR value in step S100.

The first base station 100 groups the terminals in ascending order of CINR values and assigns the terminals to a maximum power group or a limited power group in step S200. Although two groups are used in the present example, it is understood that the first base station 100 may also group the terminals in three or more groups according to CINR values. Furthermore, the base station 100 may group the terminals according to other parameters, such as Received-Signal-Strength-Indication (RSSI), Carrier-to-Interference-Ratio (CIR), Signal-to-Interference-Ratio (SIR), Signal-to-Noise-Ratio (SNR), Signal-to-Interference-plus-Noise-Ratio (SINR), and the like.

The first base-station 100 determines data regions to be allocated to the terminals grouped in the maximum power group and/or the limited power group in the uplink frame P130 in step S300. Here, the first base station 100 can determine the data region to be allocated to terminals classified in the maximum power group as the first FFR region P132, which is a dedicated resource region of the first base station 100, and can determine the data region to be allocated to terminals classified in the limited power group as the second FFR region P133 or the third FFR region P134, which are dedicated resource regions of the second base station 200 or the third base station 300, respectively.

The first base station 100 generates resource allocation information by allocating radio resources to the terminals according to the ascending order of the CINR values based on the determined data regions of the terminals in step S400. Here, the first base station 100 can allocate a subchannel of the first FFR region P132 to terminals belonging to the maximum power group, and can allocate a subchannel of the second FFR region P133 or the third FFR region P134 to terminals belonging to the limited power group.

The first base station 100 generates power control information by determining transmission power for the data regions of the uplink frame P130, that is, the first FFR region P132, the second FFR region P133, and the third FFR region P134 in step S500. Here, the first base station 100 can determine transmission power of the first FFR region P132, which is a resource region dedicated to the first base station 100, as maximum transmission power of the terminal. Also, the first base station 100 can determine transmission power for the second FFR region P133 and the third FFR region P134 based on interference from the terminal located in the service coverage area of the neighboring base station.

In step S600, the first base station 100 transmits resource allocation information and power control information to the terminal located in the first cell 110 that is a service coverage area of the first base station 100 so that the corresponding terminal may transmit the signal according to the resource allocation information and power control information.

A method for the first base station 100 of a mobile communication system to classify the second terminal 12 located in the first cell 110 into a group according to an exemplary embodiment of the present invention will now be described with reference to FIG. 4.

Figure 4:
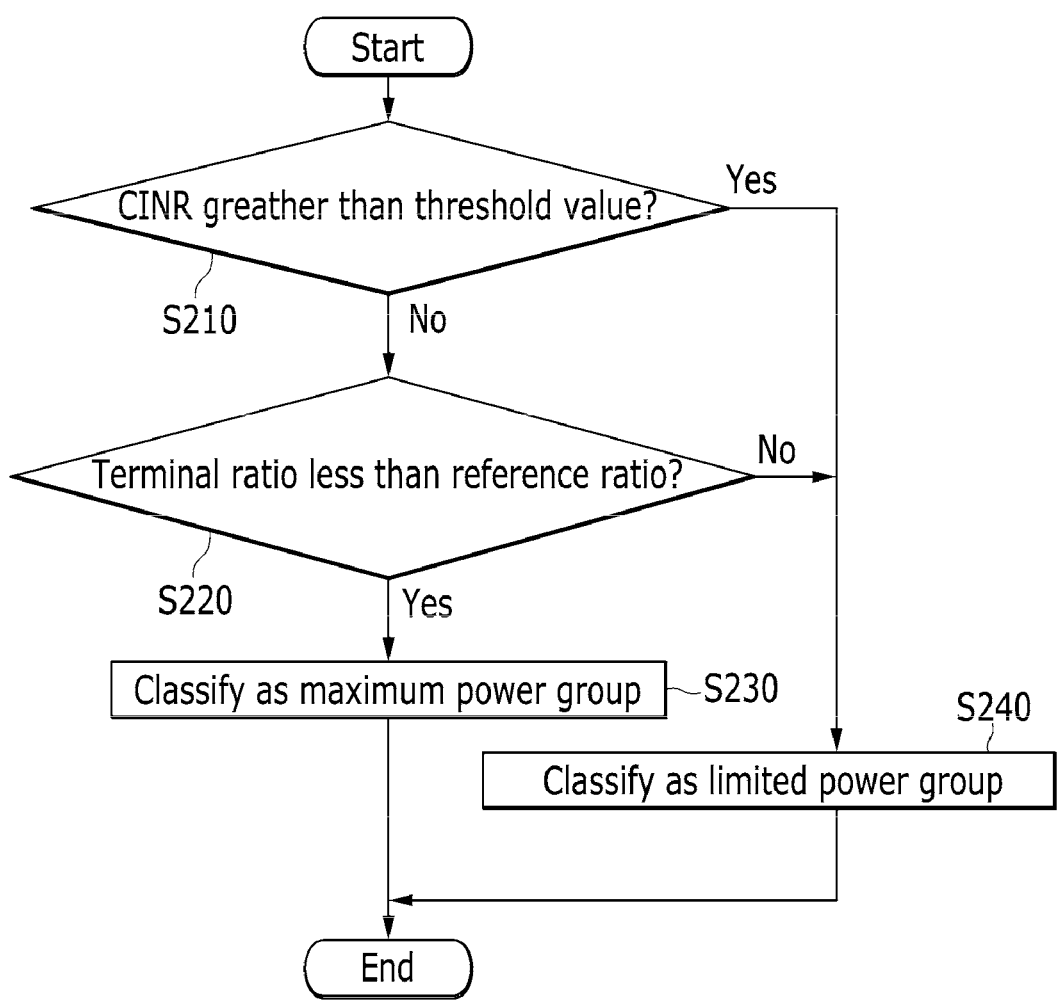
FIG. 4 shows a group classifying method according to an exemplary embodiment of the present invention.

FIG. 4 shows a group classifying method according to an exemplary embodiment of the present invention.

Referring to FIG. 4, the first base station 100 compares the CINR value measured by the second terminal 12 with a threshold value and determines whether the CINR value is greater than the threshold value regarding the second terminal 12 from among a plurality of terminals that are arranged in ascending order of CINR values in step S210.

If it is determined in step S210 that the CINR value measured by the second terminal 12 does not exceed the threshold value, the first base station 100 compares a ratio (hereinafter, terminal ratio) of the number of terminals classified in the maximum power group to the number of terminals located in the first cell 110 with a reference ratio, and determines whether the terminal ratio is less than the reference ratio in step S220.

When it is determined that the terminal ratio is less than the reference ratio, the first base station 100 classifies the second terminal 12 in the maximum power group in step S230.

On the other hand, when it is determined in step S210 that the CINR value measured by the second terminal 12 exceeds the threshold value or when it is determined in step S220 that the terminal ratio is not less than the reference ratio, the first base station 100 classifies the second terminal 12 in the limited power group in step S240.

A method for the first base station 100 of a mobile communication system to determine a data region to be allocated to the first terminal 11 classified in the limited power group according to an exemplary embodiment of the present invention will now be described with reference to FIG. 5.

Figure 5:
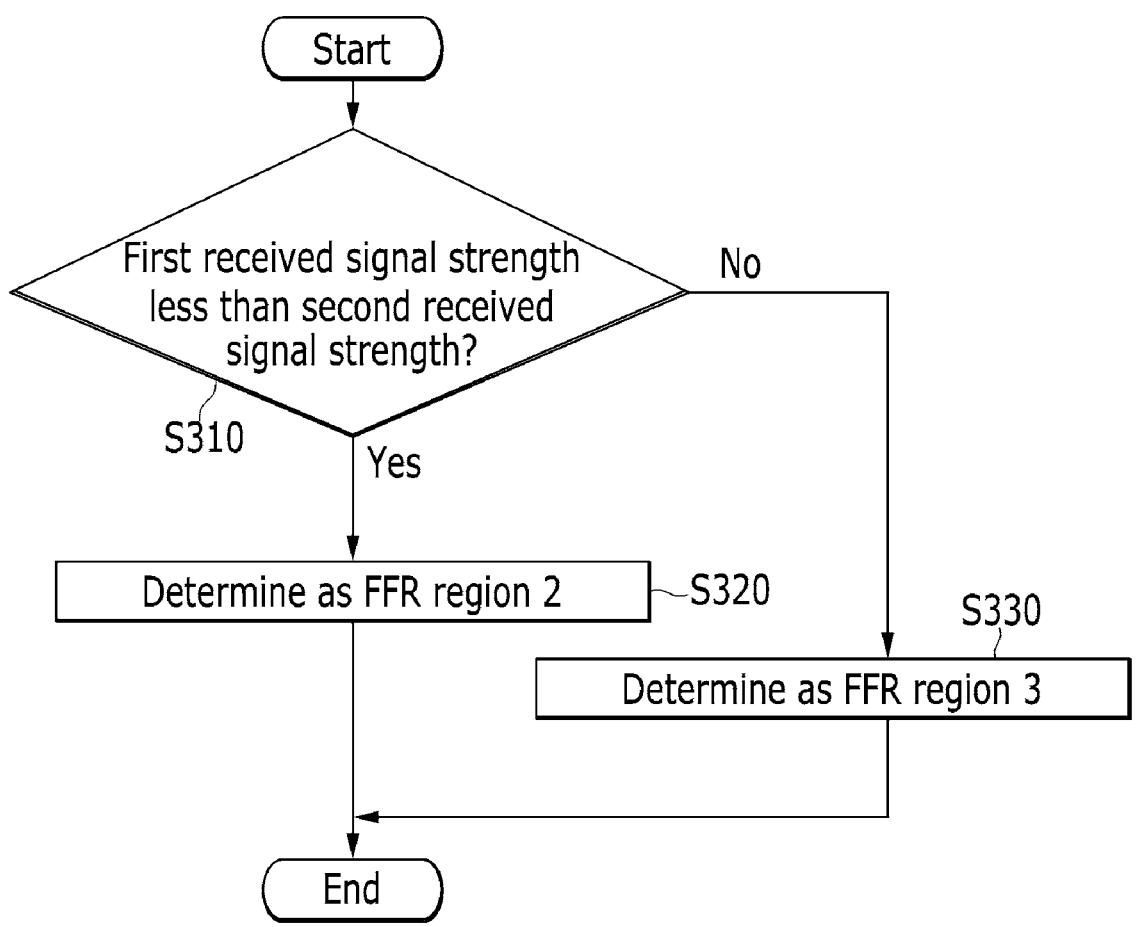
FIG. 5 shows a data region determining method according to an exemplary embodiment of the present invention.

FIG. 5 shows a data region determining method according to an exemplary embodiment of the present invention.

Referring to FIG. 5, when the first terminal 11, located in the first cell 110, measures the first received signal strength of the preamble transmitted by the second base station 200 and the second received signal strength of the preamble transmitted by the third base station 300 through the preamble region P111, and reports them to the first base station 100, which is a serving base station, the first base station 100 determines which of the second base station 200 and the third base station 300 has the lower received signal strength by comparing the first received signal strength and the second received signal strength in step S310.

When it is determined that the first received signal strength is less than the second received signal strength, the first base station 100 determines the data region to be allocated to the first terminal 11 as the second FFR region P133, which is a dedicated resource region of the second base station 200, in step S320.

On the other hand, when it is determined that the second received signal strength is less than the first received signal strength, the first base station 100 determines the data region to be allocated to the first terminal 11 as the third FFR region P134, which is a dedicated resource region of the third base station 300, in step S330.

A method for the first base station 100 of a mobile communication system to allocate a radio resource to the second terminal 12 classified into the maximum power group according to an exemplary embodiment of the present invention will now be described with reference to FIG. 6.

Figure 6:
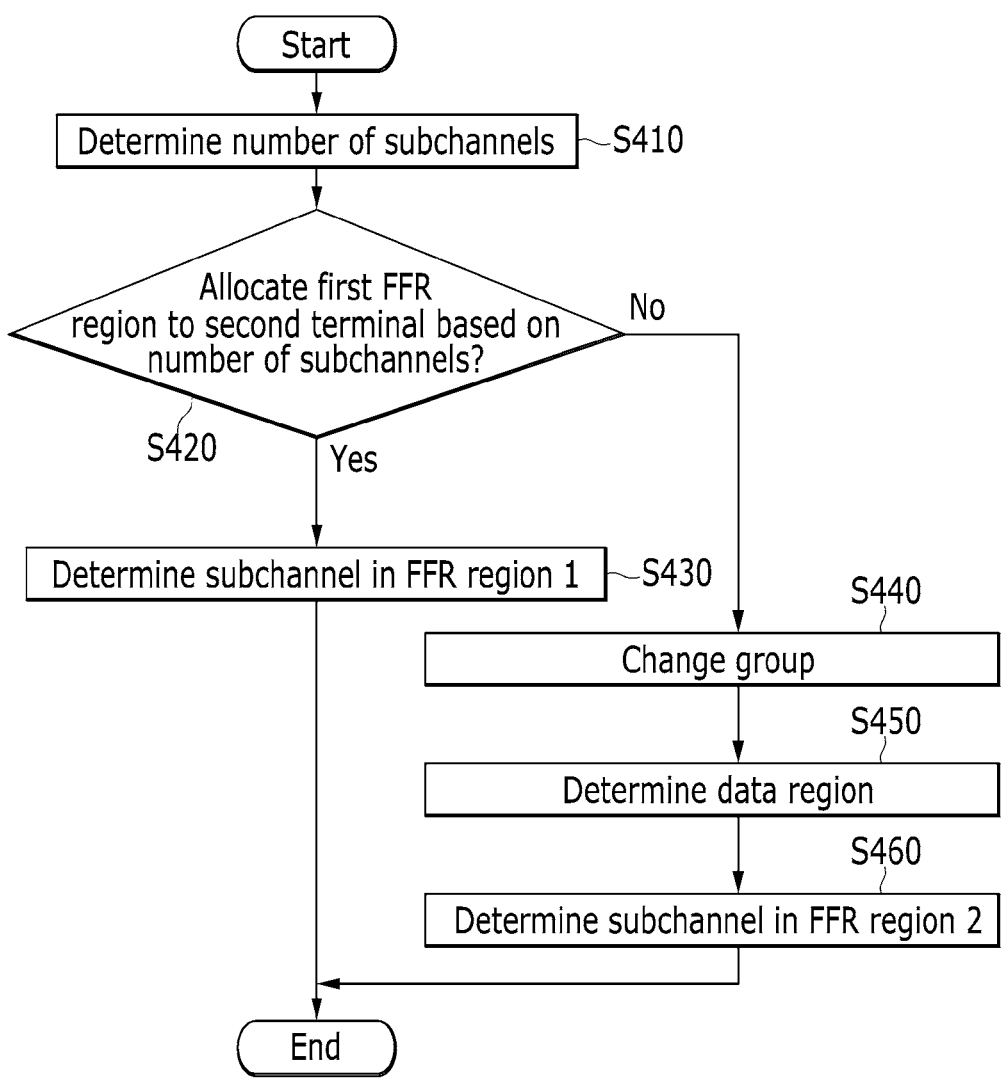
FIG. 6 shows a resource allocation method according to an exemplary embodiment of the present invention.

FIG. 6 shows a resource allocation method according to an exemplary embodiment of the present invention.

Referring to FIG. 6, the first base station 100 determines a number of subchannels to be allocated to the second terminal 12 classified in the maximum power group in step S410.

The first base station 100 determines whether to allocate the subchannel of the first FFR region P132 to the second terminal 12 by comparing the number of subchannels that can be allocated in the first FFR region P132, which is a data region allocated to the maximum power group, with the number of subchannels to be allocated to the second terminal 12 in step S420.

When it is determined in step S420 that the subchannel of the first FFR region P132 can be allocated to the second terminal 12, the first base station 100 determines the subchannel to be allocated to the second terminal 12 from among the subchannels that can be allocated in the first FFR region P132 in step S430. Here, when the subchannel of the first FFR region P132 can be allocated to the second terminal 12, the number of subchannels that can be allocated in the first FFR region P132 is greater than the number of subchannels to be allocated to the second terminal 12.

On the other hand, when it is determined in step S420 that the subchannel of the first FFR region P132 cannot be allocated to the second terminal 12, the first base station 100 changes the group of the second terminal 12 from the maximum power group to the limited power group in step S440. Here, when the subchannel of the first FFR region P132 cannot be allocated to the second terminal 12, the number of subchannels that can be allocated in the first FFR region P132 is less than the number of subchannels to be allocated to the second terminal 12.

The first base station 100 determines the data region to be allocated to the second terminal 12 in step S450. Here, the first base station 100 can determine the data region to be allocated to the second terminal 12 according to the data region determining method shown in FIG. 5, and it will be assumed that the first base station 100 has determined the data region to be allocated to the second terminal 12 as the second FFR region P133.

The first base station 100 determines the subchannel to be allocated to the second terminal 12 from among the subchannels that can be allocated in the second FFR region P133 in step S460.

A method for the first base station 100 of a mobile communication system to determine transmission power for the second FFR region P133 in the data region of the downlink frame according to an exemplary embodiment of the present invention will now be described with reference to FIG. 7.

Figure 7:
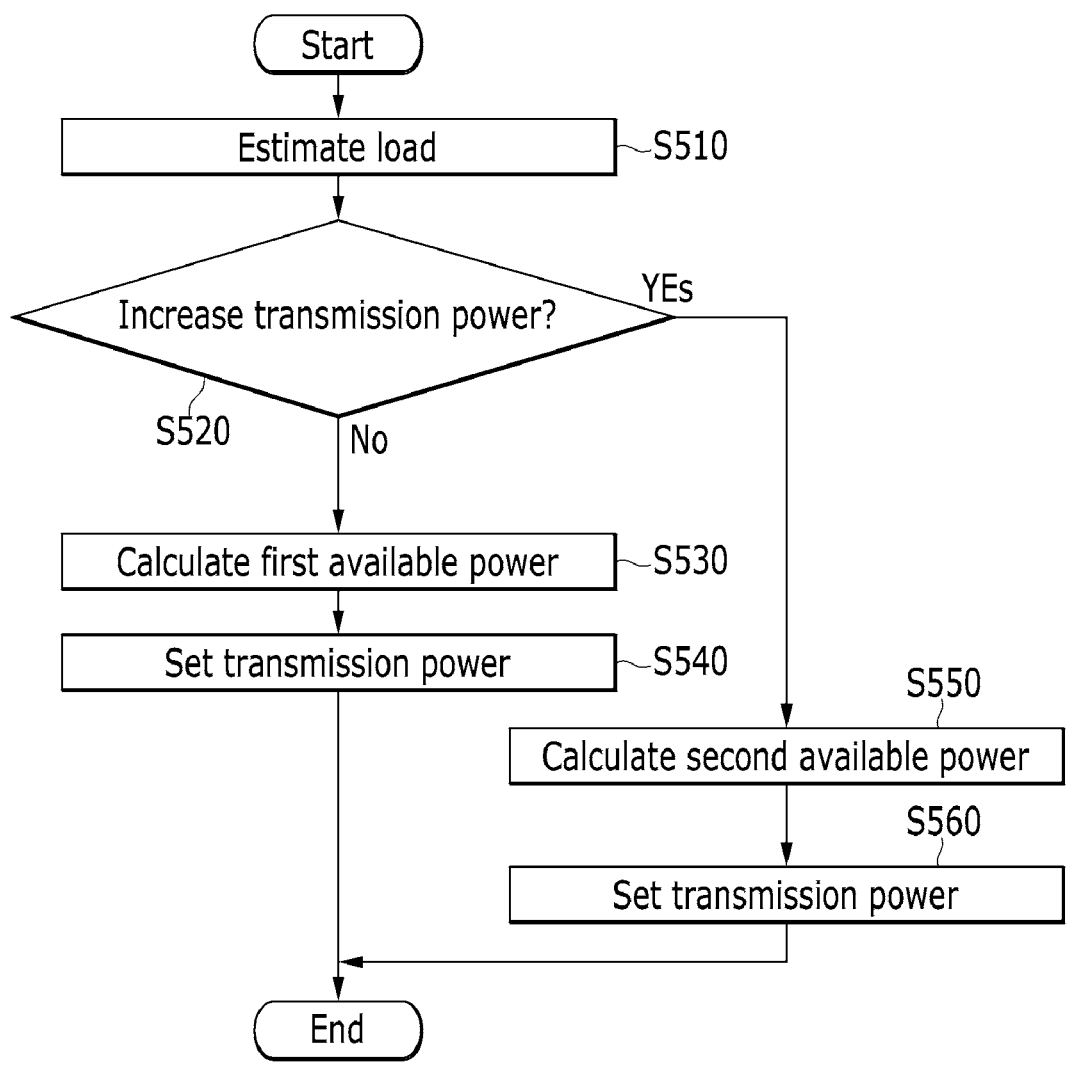
FIG. 7 shows a transmission power determining method according to an exemplary embodiment of the present invention.

FIG. 7 shows a transmission power determining method according to an exemplary embodiment of the present invention.

According to an exemplary implementation as described below, the second base station 200 uses the second FFR region P133 as the dedicated resource region, and the fourth terminal 14 located in the second cell 210 of the second base station 200 transmits the signal to the second base station 200 through the subchannel of the second FFR region P133.

Referring to FIG. 7, the first base station 100 estimates a load for the second FFR region P133 in step S510. According to an exemplary embodiment, the first base station 100 estimates the load for the second FFR region P133 by measuring interference from the fourth terminal 14. Here, the first base station 100 can measure the interference based on a sounding signal transmitted periodically by the fourth terminal 14 through the second sounding region P136 corresponding to the second FFR region P133.

In an exemplary implementation, the first base station 100 calculates the Interference over Thermal (IoT) value to estimate the load.

In this instance, the first base station 100 can calculate the IoT value IoT(z,k) according to Equation 1.

$$IoT(z, k) = \frac{\sum_{n=0}^{N_{allocated}} |I[z, n, k]|^2 + \sum_{n=0}^{N_{unused}} |R[z, n, k]|^2}{\sigma^2} \quad \text{(Equation 1)}$$

Here, z denotes an index of the FFR region, k denotes an index of the frame, and n denotes an index of the subcarrier. Also, $N_{allocated}$ denotes a number of allocated subcarriers, and $N_{unused}$ denotes a number of unused subcarriers. Further, I denotes the strength of the interference signal, R denotes the strength of the received signal, and σ denotes the strength of the thermal noise.

In this instance, the first base station 100 can calculate the IoT value IoT(z,k) according to Equation 2.

$$IoT(z, k) = \frac{\sum_{m=0}^{M} |S[z, m, k]|^2}{\sigma^2} \quad \text{(Equation 2)}$$

Here, z denotes an index of the FFR region, k denotes an index of the frame, and m denotes an index of the subcarrier. Also, S denotes the strength of the sounding signal, M denotes the number of subcarriers of the sounding region corresponding to the FFR region, and σ denotes the strength of thermal noise.

Further, the first base station 100 can estimate the load by calculating a stacked average value of the calculated IOT value IoT(z,k).

In this instance, the first base station 100 can calculate the stacked average value avgIoT(z,k) according to Equation 3.

$$\text{avgIoT}(z,k) = \text{avgIoT}(z,k-1)*(1-1/\text{avg\_factor}) + \text{IoT}(z,k)*(1/\text{avg\_factor}) \quad \text{(Equation 3)}$$

Here, z denotes an index of the FFR region, k denotes an index of the frame, and avg_factor denotes a variation value of the stacked average.

The first base station 100 determines whether to increase transmission power of the second FFR region P133 by comparing the estimated load and a reference load in step S520.

When it is determined in step S520 that the transmission power should not be increased, the first base station 100 calculates the first available power in step S530. Here, the case of reducing transmission power corresponds to the case in which the estimated load is greater than the reference load. In this instance, the first base station 100 can calculate the first available power ($P_{avail}(z,k)$) according to Equation 4.

$$P_{avail}(z,k) = P_{avail}(z,k-1) - \Delta P \quad \text{(Equation 4)}$$

Here, z denotes an index of the FFR region, k denotes an index of the frame, and ΔP denotes variation of transmission power. Also, $P_{avail}(z,k-1)$ denotes available power at the (k−1)-th frame.

The first base station 100 sets the lesser one between the maximum transmission power of the terminal and the first available power as transmission power of the second FFR region P133 in step S540.

When it is determined in step S520 that transmission power should be increased, the first base station 100 calculates the second available power in step S550. Here, the case of increasing transmission power corresponds to the case in which the estimated load is less than the reference load. In this instance, the first base station 100 can calculate the second available power $P_{avail}(z,k)$ according to Equation 5.

$$P_{avail}(z,k) = P_{avail}(z,k-1) + \Delta P \quad \text{(Equation 5)}$$

Here, z denotes an index of the FFR region, k denotes an index of the frame, and ΔP denotes a variation value of transmission power. Also, $P_{avail}(z,k-1)$ denotes available power at the (k−1)-th frame.

The first base station 100 sets the lesser one between the maximum transmission power of the terminal and the second available power as transmission power of the second FFR region P133 in step S560.

According to an exemplary embodiment of the present invention, when communication between base stations is impossible or otherwise unavailable in a mobile communication system, efficient power control for the terminal is allowable without exchanging information between the base stations by measuring interference caused by the terminal of a neighboring cell. Also, interference between adjacent cells can be reduced by allocating a radio resource to the terminal based on the CINR value measured by the terminal.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While this invention has been described with reference to certain exemplary embodiments thereof, it is will be understood by those skilled in the art that various changes and modifications may be made therein without departing from the spirit and scope of the invention as defined by the appended claims and their equivalents.

What is claimed is:

1. A method for a base station serving a plurality of terminals to allocate radio resources of an uplink frame to the terminals in a mobile communication system unavailable for communication between base stations, the method comprising:

arranging the plurality of terminals in ascending order of Carrier to Interference and Noise Ratios (CINRs) based on the CINRs that are measured by the terminals;

classifying the plurality of terminals in one of a first group and a second group according to the order;

allocating a subchannel of a data region corresponding to the first group from among a plurality of data regions included in the uplink frame to a terminal classified in the first group; and allocating a subchannel of a data region corresponding to the second group from among the plurality of data regions to a terminal classified in the second group.

2. The method of claim 1, wherein the classifying of the plurality of terminals comprises:

classifying the plurality of terminals in one of the first group and the second group according to the order and a ratio.

3. The method of claim 2, wherein the classifying of the plurality of terminals further comprises:

comparing a CINR measured by a first terminal from among the plurality of terminals with a threshold;

when the CINR measured by the first terminal does not exceed the threshold, comparing a first ratio corresponding to a ratio of a number of terminals classified in the first group with a reference ratio; and when the first ratio is less than the reference ratio, classifying the first terminal in the first group.

4. The method of claim 3, wherein the classifying of the plurality of terminals further comprises:

when the CINR measured by the first terminal exceeds the threshold, classifying the first terminal in the second group.

5. The method of claim 3, wherein the classifying of the plurality of terminals further comprises:

when the first ratio is greater than the reference ratio, classifying the first terminal in the second group.

6. The method of claim 1, wherein the allocating of the subchannel of the data region corresponding to the first group comprises:

determining a number of subchannels to be allocated to the first terminal classified in the first group; and when a number of subchannels that can be allocated in the data region corresponding to the first group is greater than a number of subchannels to be allocated to the first terminal, determining a subchannel to be allocated to the first terminal from among the subchannels that can be allocated in the data region corresponding to the first group.

7. The method of claim 6, wherein the allocating of the subchannel of the data region corresponding to the first group further comprises:
when a number of subchannels to be allocated to the first terminal is greater than a number of subchannels that can be allocated in the data region corresponding to the first group, changing the first terminal from the first group to the second group; and
determining the subchannel to be allocated to the first terminal from among subchannels that can be allocated in the data region corresponding to the second group.

8. The method of claim 7, wherein the allocating of the subchannel of the data region corresponding to the second group further comprises:
receiving received signal strength of a preamble transmitted by the first base station neighboring the serving base station and received signal strength of a preamble transmitted by the second base station, from the first terminal among the plurality of terminals; and
comparing the received signal strength of the preamble transmitted by the first base station with the received signal strength of the preamble transmitted by the second base station and determining a data region corresponding to the first terminal classified as the second group.

9. The method of claim 8, wherein the determining of the data region corresponding to the first terminal comprises:
when the received signal strength of the preamble transmitted by the first base station is less than the received signal strength of the preamble transmitted by the second base station, determining the data region corresponding to the first terminal as a first data region corresponding to the preamble transmitted by the first base station from among the plurality of data regions; and
when the received signal strength of the preamble transmitted by the second base station is less than the received signal strength of the preamble transmitted by the first base station, determining the data region corresponding to the first terminal as a second data region corresponding to the preamble transmitted by the second base station from among the plurality of data regions.

10. The method of claim 1, further comprising:
determining transmission power of the data region corresponding to the first group as the maximum transmission power of the terminal classified in the first group; and
determining transmission power of the second data region based on interference from a second terminal located in a service coverage area of a neighboring base station.

11. The method of claim 10, wherein the determining of the transmission power of the second data region based on interference from the second terminal comprises determining an Interference over Thermal (IoT) value for the second data region using the equation:

$$IoT(z, k) = \frac{\sum_{n=0}^{N_{allocated}} |I[z, n, k]|^2 + \sum_{n=0}^{N_{unused}} |R[z, n, k]|^2}{\sigma^2}$$

wherein z denotes an index of the data region, k denotes an index of the uplink frame, n denotes an index of a subcarrier, Nallocated denotes a number of allocated subcarriers, Nunused denotes a number of unused subcarriers, I denotes the strength of the interference signal, R denotes the strength of the received signal, and u denotes the strength of the thermal noise.

12. The method of claim 10, wherein the determining of the load for the second data region comprises using the equation:

$$IoT(z, k) = \frac{\sum_{m=0}^{M} |S[z, m, k]|^2}{\sigma^2}$$

wherein z denotes an index of the data region, k denotes an index of the uplink frame, m denotes an index of the subcarrier, u denotes the strength of the thermal noise, S denotes the strength of a sounding signal, and M denotes the number of subcarriers of the sounding region corresponding to the data region.

13. The method of claim 10, wherein the determining of the load for the second data region comprises using the equation:

avgIoT(z,k)=avgIoT(z,k−1)*(1−1/avg_factor)+IoT(z,k)*(1/avg_factor)

wherein z denotes an index of the data region, k denotes an index of the uplink frame, and avg_factor denotes a variation value of the stacked average.

14. The method of claim 10, wherein the determining of the transmission power of the second data region based on interference from the second terminal comprises determining an Interference over Thermal (IoT) value for the second data region.

* * * * *